Figure 1:
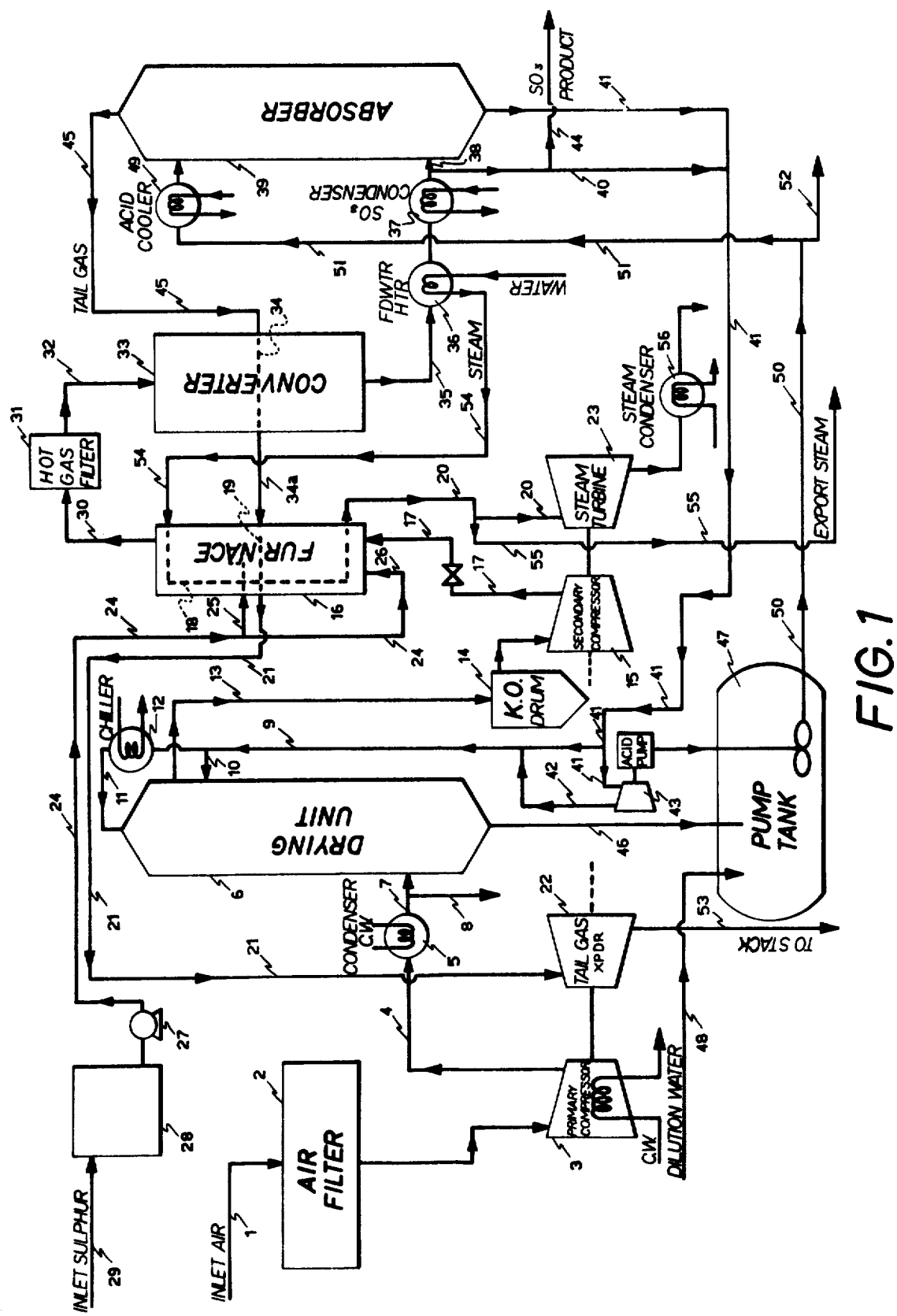

United States Patent [19]

Cameron et al.

[11] 4,213,958

[45] Jul. 22, 1980

[54] PRODUCTION OF SULPHUR TRIOXIDE, SULPHURIC ACID AND OLEUM

[75] Inventors: Gordon M. Cameron, Sudbury; Frederick W. S. Jones, Rosemere; Peter D. Nolan, Sudbury, all of Canada

[73] Assignee: Canadian Industries Limited, Montreal, Canada

[21] Appl. No.: 851,198

[22] Filed: Nov. 14, 1977

Related U.S. Application Data

[63] Continuation of Ser. No. 443,907, Feb. 19, 1974, abandoned, which is a continuation-in-part of Ser. No. 300,189, Oct. 24, 1972, abandoned.

[51] Int. Cl.² .................. C01B 17/72; C01B 17/08
[52] U.S. Cl. .................................... 423/522; 423/533
[58] Field of Search ............ 423/522, 525, 531, 532, 423/533, 534, 536, 538

[56] References Cited

U.S. PATENT DOCUMENTS

| | | | |
|---|---|---|---|
| 1,823,372 | 9/1931 | Merrian | 423/522 |
| 3,432,263 | 3/1969 | Ohsol | 423/529 |
| 3,455,652 | 7/1969 | James | 423/529 |
| 3,475,120 | 10/1969 | Maurer et al. | 423/522 |
| 3,536,446 | 10/1970 | Maurer | 423/522 |

FOREIGN PATENT DOCUMENTS

| | | | |
|---|---|---|---|
| 744803 | 7/1970 | Belgium | 423/522 |
| 1105277 | 3/1968 | United Kingdom | 423/533 |
| 1230130 | 4/1971 | United Kingdom | 423/529 |

Primary Examiner—O. R. Vertiz
Assistant Examiner—Gary P. Straub
Attorney, Agent, or Firm—Cushman, Darby & Cushman

[57] ABSTRACT

In a process for manufacturing sulphuric acid by catalytic conversion of gaseous sulphur dioxide to sulphur trioxide in the presence of dry air and under high pressure, the improvement comprising feeding the converted gas stream under high pressure to an absorbing unit, circulating essentially sulphur dioxide-free sulphuric acid through the absorbing unit to absorb the sulphur trioxide and unconverted sulphur dioxide from said converted gas stream, depressurizing the acid, simultaneously stripping the sulphur dioxide from the acid by means of air or a sulphur dioxide-free gas and removing moisture from said air or sulphur dioxide-free gas by means of said acid, cooling the resulting essentially sulphur dioxide-free acid and recirculating at least part of it to the absorbing unit. In a preferred embodiment, the process comprises the additional step of condensing part of the sulphur trioxide and unconverted sulphur dioxide constituting the converted gas stream and feeding the remainder to the absorbing unit. The condensate is partly or wholly recovered as a product or injected in the sulphuric acid streams.

29 Claims, 2 Drawing Figures

PRODUCTION OF SULPHUR TRIOXIDE, SULPHURIC ACID AND OLEUM

This is a continuation, of application Ser. No. 443,907 filed Feb. 19, 1974, and now abandoned which was a continuation-in-part of application 300,189, filed on Oct. 24, 1972 now abandoned.

This invention relates to the production of sulphur trioxide, sulphuric acid and oleum in plants operating at pressures of 5 atmospheres or higher. An improved high pressure process is provided in which a very high level of sulphur dioxide conversion is attained with consequent exhaust gases of very low sulphur dioxide content.

At present, conventional sulphuric acid plants operate substantially at atmospheric pressure regardless of the sulphur dioxide source. In plants utilizing sulphur, the process normally consists of air drying, gas compression, sulphur combustion, catalysis and absorption of sulphur trioxide formed in concentrated sulphuric acid. The gas stream normally contains about 8% sulphur dioxide and with a multi-step catalysis it is possible to achieve 98% conversion of the sulphur to sulphuric acid. The effluent gases containing about 2000 ppm sulphur dioxide as well as acid mist and some unabsorbed sulphur trioxide are then exhausted to atmosphere through high stacks. Heat released by sulphur combustion and oxidation to sulphur trioxide is recovered where possible and used to generate steam for export to other operations. These plants are large and costly and because of the sulphur dioxide, sulphur trioxide and sulphuric acid mist in the exhaust gases are now considered as significant polluters and are no longer acceptable in most developed countries.

In the conventional conversion systems, the oxidation of sulphur dioxide to sulphur trioxide is normally carried out in a series of catalyst beds with cooling of the gases between beds. The ultimate conversion efficiency is governed by an equilibrium relationship between sulphur dioxide sulphur trioxide and oxygen which is dependent on temperature and pressure. The catalyst beds are tailored to give as close an approach to said equilibrium as possible at the lowest temperature at which the catalyst is normally active. In the standard single absorption plant, the temperature of the gases at the converter's exit is about 430° C. and the conversion efficiency is about 98%.

The need for higher plant conversion efficiencies with less sulphur dioxide emission to atmosphere has led to the development of the "double absorption" process in which the above described conventional process is modified to provide for reheating of the tail gas to converter temperature, conversion of the bulk of the sulphur dioxide present in said tail gas to sulphur trioxide and absorption of the sulphur trioxide so formed in a secondary absorption system. The gases fed to the converter, as in all acid plants, having a significant excess of oxygen over the stoichiometric amount necessary for complete oxidation of sulphur dioxide to sulphur trioxide, it follows that the gas stream which, after the first absorption stage, is reheated for further conversion and second absorption contains a massive excess of oxygen relative to the sulphur dioxide content. As a consequence the sulphur dioxide content of the gas stream is reduced by said further conversion and second absorption to a small fraction of that conventionally obtained and conversion efficiencies of the order of 99.7% or better are obtained which should satisfy most antipollution requirements. However, in spite of its satisfactory conversion efficiency, the "double absorption" process is somewhat unattractive in that it requires the installation of additional costly equipment and complicates the plant flowsheet.

Further investigations into ways of improving the conversion efficiency in sulphuric acid plants, have led to the suggestion that the oxidation of sulphur dioxide to sulphur trioxide would be improved if it were carried out under superatmospheric pressure. Several such processes operating under a pressure of 2 to 10 atmospheres are described in a number of patents such as British Pat. Nos. 467,298, 519,570 and 571,207, Czechoslovakian Pat. Nos. 98,425, 99,072 and 100,362 and U.S. Pat. Nos. 2,510,684 and 3,455,652. In British Pat. No. 1,230,130 and U.S. Pat. No. 3,432,263 it is even proposed that high pressure and double absorption be both used in order to arrive at a more stringent control of sulphur dioxide emission in the tail gas. These high pressure processes as compared with the atmospheric pressure and double absorption processes are said to result in the handling of much smaller gas volumes, in the improvement of the conversion efficiency, in the improvement of the activity of the catalyst and in the use of smaller catalyst masses. However, the use of high pressures, while affording the above advantages, has the effect of significantly increasing the solubility of sulphur dioxide in sulphuric acid with the result that, too often, a product sulphuric acid is obtained which contains an unacceptable level of dissolved sulphur dioxide. In the case of U.S. Pat. No. 3,432,263, such feature has made it necessary to resort to a stripper to reduce the sulphur dioxide content of the product sulphuric acid to levels acceptable in the market place.

As can be seen from the foregoing, the efforts heretofore made to develop sulphuric acid manufacturing processes with higher conversion efficiencies and ecologically acceptable tail gas emission have been mostly devoted to improving the yield of the catalytic oxidation of sulphur dioxide to sulphur trioxide, whether by the removal of sulphur trioxide prior to the last stage of catalysis such as in double absorption or by the use of higher operating pressures which favour said oxidation, or by combinations of these two concepts.

It has now been found that the combined effects of the use of superatmospheric pressures in sulphuric acid plants can be used with great advantage in the devising of an improved process wherein an essentially sulphur dioxide-free product sulphuric acid and a tail gas ecologically acceptable for exhaust to atmosphere, are obtained without having to resort to secondary conversion and absorption steps.

It is thus an important object of this invention to provide an improved and economic process for making sulphuric acid using pressures well above atmospheric, in which very high sulphur conversion efficiencies and energy recovery can be obtained without the complexities of existing sulphuric acid plants.

A further object is to provide a simple process for sulphuric acid manufacture in which sulphuric acid is used to absorb and recycle unconverted sulphur dioxide, the drying system being used simultaneously for drying air and for stripping sulphur dioxide from sulphuric acid, and the absorbing system being adapted not only to absorb sulphur trioxide but also to absorb essentially all of the unreacted sulphur dioxide from the converted gas stream, whereby an overall efficiency is obtained which is far greater than that obtainable by catalysis alone.

A further object is to provide a process in which liquid sulphur trioxide and all strengths of oleum can be manufactured directly without the need for additional absorption towers and/or distillation columns for enrichment.

Another object is to provide a process wherein the superatmospheric pressure allows at least partial condensation of sulphur trioxide and co-condensation of part of the unreacted sulphur dioxide upstream of the absorbing system with recirculation of part or all of the co-condensate to the drying system.

As an improvement in high pressure processes for making sulphuric acid by conversion of sulphur dioxide to sulphur trioxide in the presence of dry air and under super-atmospheric pressure, the present invention comprises the steps of feeding the converted gas stream under a pressure of 5 to 50 atmospheres to an absorbing unit, circulating essentially sulphur dioxide-free concentrated sulphuric acid through said absorbing unit to absorb the sulphur trioxide and unconverted sulphur dioxide from said converted gas stream, depressurizing the acid to a pressure at least 4 atmospheres below that existing in the absorbing unit and within the range of atmospheric pressure to 10 atmospheres, bringing said acid into countercurrent contact with air or a sulphur dioxide-free gas in a drying unit wherein simultaneously moisture from the air or sulphur dioxide-free gas is transferred to the acid and sulphur dioxide is transferred from the acid to the air or sulphur dioxide-free gas, compressing the resulting mixture of dry air or sulphur dioxide-free gas and sulphur dioxide to 5 or 50 atmospheres and using it as process air in the conversion of sulphur or sulphur dioxide to sulphur trioxide, cooling the resulting essentially sulphur dioxide-free sulphuric acid stream from the drying unit and dividing it into two portions of which one is withdrawn as product sulphuric acid and the other is used as the concentrated sulphuric acid for absorption of sulphur trioxide and sulphur dioxide from the converted gas stream in the absorbing unit.

Described in more details as applied to the production of sulphuric acid from a sulphur dioxide feed gas obtained by sulphur burning, the process of the invention comprises the steps of drying air under a pressure of up to 10 atmospheres by means of a sulphur dioxide-rich sulphuric acid stream while simultaneously transferring the sulphur dioxide from the acid to the air stream and producing an essentially sulphur dioxide-free sulphuric acid stream, compressing the resulting mixture of dry air and sulphur dioxide to a pressure level of 5 to 50 atmospheres, feeding the air stream to a sulphur burning furnace wherein air reacts with sulphur to form a hot sulphur dioxide-containing feed gas, cooling and bringing said feed gas into contact with a catalyst such as vanadium pentoxide whereby sulphur dioxide is oxidized to sulphur trioxide with heat formed during the catalytic reaction being removed as required, cooling the resultant converted gas mixture containing a significant amount of sulphur trioxide and traces of sulphur dioxide, passing the said converted gas through an absorbing tower at said pressure of 5 to 50 atmospheres countercurrently to a stream of the essentially sulphur dioxide-free sulphuric acid generated in the air drying operation whereby complete absorption of the sulphur trioxide and essentially complete absorption of the unconverted sulphur dioxide are achieved. The sulphur dioxide-rich sulphuric acid coming out of the absorber is passed through a let-down device or turbine where its pressure is reduced to that existing in the air drying unit and then is circulated into said drying unit for sulphur dioxide stripping and air drying as hereinbefore described. Any necessary water additions and product take-off are effected after the drying and sulphur-dioxide stripping operation. The off gas from the absorber is heated by means of heat generated in the process or elsewhere, expanded for power recovery and, because of its very low and ecologically acceptable content of sulphur dioxide, is directly exhausted to atmosphere through a stack.

In a preferred embodiment of the invention, the gas mixture leaving the conversion system is passed through a condenser prior to the absorption step whereby 5% to 90% by weight of the sulphur trioxide and up to 70% by weight of the sulphur dioxide present in said gas mixture are co-condensed, the remaining uncondensed sulphur trioxide and sulphur dioxide being thereafter fed to the absorber. The resulting co-condensate which is essentially comprised of liquid sulphur trioxide, may then be recovered as product and/or injected into the sulphur dioxide-rich sulphuric acid stream leaving the absorber in any proportion of up to 100%. This step has the most appreciable advantage of cooling the converted gas stream to a considerable extent and of consequently facilitating the following absorption operation.

As can be realized from the foregoing, a tail gas having an ecologically acceptable low sulphur dioxide content is obtained in accordance with the process of the invention, by using to contact the converted gas stream, an essentially sulphur dioxide-free sulphuric acid stream which has an optimum capacity to absorb not only the sulphur trioxide but also and especially the sulphur dioxide present in said converted gas stream. In addition the conditons of pressure and temperature in the absorber are chosen to favour absorption of sulphur dioxide rather than sulphur trioxide which has mass transfer coefficients for absorption far higher than those for sulphur dioxide. It has been determined that the pressure must be 5 to 50 atmospheres and preferably 15 to 25 atmospheres while the temperature of the acid stream at entrance into the absorber should be 20° C. to 60° C. and preferably 30° C. to 50° C.

Upon leaving the absorber, the sulphuric acid stream now carrying absorbed sulphur dioxide is fed, after decompression, to the top of the drying tower where the sulphur dioxide is desorbed, transferred to the process air and injected into the feed gas flowing to the converter. Again the pressure and temperature conditions in the drying tower are chosen to favour desorption of sulphur dioxide from the sulphuric acid stream. A pressure of up to 10 atmospheres, preferably of up to 5 atmospheres and most preferably atmospheric pressure has been found suitable. The temperature of the acid stream at entrance into the drying tower should be at 20° C. to 75° C. and preferably at 30° C. to 50° C. While a higher temperature could be used, such however is not desirable due to the fact that the process air would be expanded while immediately upon leaving the drying tower it must be compressed to the pressure level existing in the absorber.

In accordance with the principles of the invention which aim at favouring absorption and desorption of sulphur dioxide into and from sulphuric acid, the pressure maintained in the drying tower must at all times be lower than that maintained in the absorber. It has thus been established that the difference between the two pressure levels should be at least 4 atmospheres and preferably at least 15 atmospheres.

Figure 2:
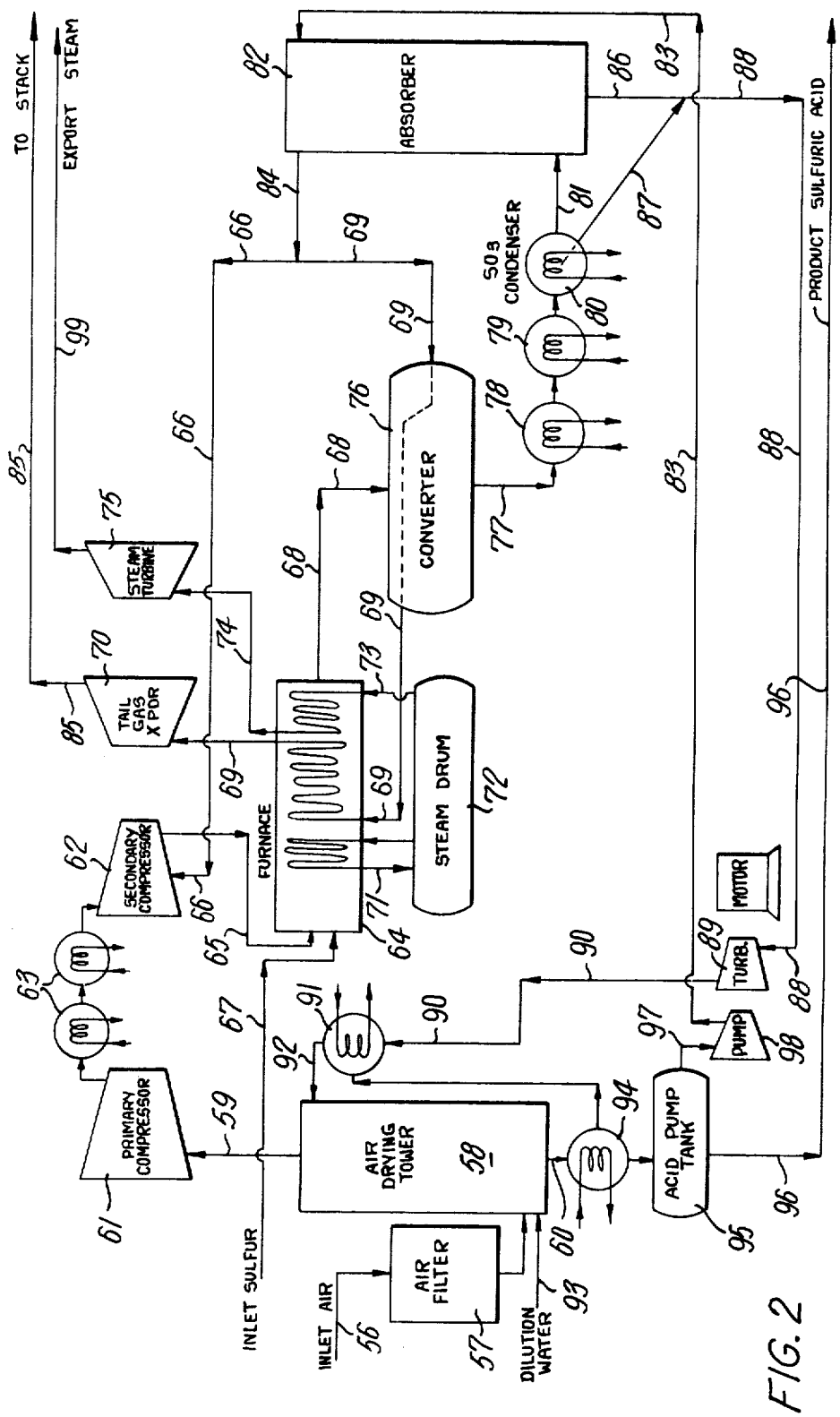

The invention will now be illustrated by means of the following non-limitative Examples and the attached drawings in which both FIGS. 1 and 2 are flowsheets of plants adapted to carry out the process of the invention.

EXAMPLE 1

The process in a preferred embodiment illustrated in FIG. 1 is applied to a 250 ton/day sulphuric acid plant using sulphur, air and water as raw materials. In the process, an inlet stream 1 amounting to 70000 lbs./hr. and in sufficient quantity to produce a 9% sulphur dioxide gas at the converter is drawn through an air filter 2 and compressed to 7.8 atm. in a primary compressor 3. The compressed air stream 1 is then fed via line 4 to a condenser 5 where it is cooled at the same time as moisture is removed therefrom by condensation. This condensation is useful in reducing the net flow of moisture into the process and allows the production of essentially water-free product. The air stream 1 which, on leaving the condenser 5, is at 90° F., i.e. 20° F. above the cooling water inlet temperature, is then introduced into drying unit 6 via line 7 and the condensed water is removed from the system through line 8. In the drying unit 6, the air stream is dried to a very low moisture content by contact with sulphur dioxide-rich acid stream 9 coming, as will be explained hereinafter, from the absorbing tower, and it strips most of the dissolved sulphur dioxide from said acid stream. Introduction of sulphur dioxide-rich acid stream 9 into drying unit 6 is effected through lines 10 and 11 and cooling unit 12. During unit 6 is operated at the above primary pressure of 7.8 atm. and at a temperature of 40° C. to 70° C. and is a packed or plate type tower although other types of contactors, such as Venturi scrubbers, may be used depending on circumstances.

On leaving drying unit 6, air stream 1 now containing the sulphur dioxide stripped from acid stream 9, is driven via line 13 and knock out drum 14 to a secondary compressor 15 where it is compressed to a pressure level of 28.1 atm. and fed to a sulphur burning furnace 16 via line 17. Stream and tail gas are circulated through lines 18 and 19 respectively in furnace 16 in order to control the temperature of the gas produced by the burning of sulphur in the presence of air stream 1 and to obtain a super-heated steam stream 20 and a hot tail gas stream 21 from which, as will appear hereinafter, energy is later recovered through expansion in suitable power recovery turbines 22 and 23. Sulphur is provided to furnace 16 in molten form through lines 24, 25 and 26, by pump 27 from melting unit 28 and sulphur feed main inlet 29. The gas stream 30 obtained at the exit of furnace 16 has a sulphur dioxide content of 9% and a temperature in the range of 350° C. to 450° C., and is suitable as a feed to converter 33 for the catalytic conversion of sulphur dioxide to sulphur trioxide. The hot feed gas 30 is then passed through a hot gas filter 31 to remove impurities prior to reaching the converter 33 and is fed via line 32 to said converter where the sulphur dioxide is essentially completely converted to sulphur trioxide. The heat generated in the converter is used to heat the tail gas in line 34 before the latter's entrance into the furnace via line 34a for final heating prior to expansion in power recovery turbine 22. At the secondary operating pressure of 28 atm. used in the process, it is normal to expect conversion efficiencies of 99.7% or better and effluent gases having a sulphur dioxide content of 300 ppm or lower. In order, however, to substantially increase the conversion efficiency and lower the sulphur dioxide content in effluent gases, the converted gas stream 35 from the converter 33 i.e. the gas containing the sulphur trioxide and a minor amount of unconverted sulphur dioxide, is subjected to the following treatments in accordance with the invention. Upon issuance from the converter 33 the converted gas stream 35 at about 400° C. is cooled in a feed water heater 36 to about 200° C. and successively passed into a condenser 37 where 80% of the sulphur trioxide at least 28% of the sulphur dioxide are co-condensed and thence through line 38 into the lower part of absorbing tower 39 where the remainder of the sulphur trioxide and most of the remaining sulphur dioxide are absorbed in stream of sulphuric acid fed to the top of said absorbing tower. The co-condensate of sulphur trioxide and sulphur dioxide is wholly or partly added via line 40 to the acid stream 41 coming from the bottom of absorbing tower 39 and recirculated to the drying tower 6 via lines 42, 9 and 10, chiller 12 and line 11 after passing through a pressure let down device 43. The part, if any, of the co-condensate which is not added to the acid stream 41 is recovered as a sulphur trioxide product through line 44. Where it is desired to obtain oleum or to remove more sulphur dioxide and sulphur trioxide from the converted gas prior to absorber 39, the sulphur trioxide condenser 37 is irrigated with cold sulphuric acid.

The absorbing tower is a packed or plate tower in which the converted gas stream from the condenser and the absorbing acid stream are allowed to flow counter-current to each other and in which the sulphur dioxide and sulphur trioxide are essentially completely removed from the converted gas stream. This produces an extremely clean effluent gas stream 45 and a sulphur dioxide rich acid stream 41 which is circulated through pressure let down device 43 and then passed through drying unit 6 at primary compressor (3) outlet pressure. In the drying unit, the sulphur dioxide contained in acid stream coming from line 10 and/or line 11 is essentially completely transferred to process air stream 7. From drying unit 6, the sulphur dioxide-stripped acid flows through line 46 to a pump tank 47 and is there diluted as required for strength control with water from line 48. The acid is then pumped to main acid plant cooler 49 via lines 50 and 51 and thence into the absorber 39 for more absorption of uncondensed sulphur trioxide and dioxide from line 38 at secondary compressor (15) outlet pressure. Acid product is bled off at 52.

Typical sulphur dioxide contents in acid streams entering and leaving the absorber 38 at 49 and 41 respectively are 8 and 80 ppm. In the above operation, the acid is circulated at the rate of 400,000 to 500,000 pounds per hour at 97–100% concentration and flow is from the top of the absorber through the absorber and from there to the top of the air drying unit using the differential in pressure between said absorber and drying unit to ensure flow. The absorber is provided with a very efficient mist eliminator (not shown), and the compressed effluent gas stream 45 is heated in the converter at 34, further heated in the furnace at 19, then expanded at 22 to recover power and discharged to atmosphere through line 53 and a stack. The sulphur dioxide emission for the 250 ton/day plant amounts to 123 lbs. per day, which corresponds to 8 oz. sulphur dioxide emission per ton of acid produced.

In power, the primary and secondary compressors 3 and 15 require a quantity slightly in excess of 5000 HP, 80% of which is supplied by the tail gas expansion as explained hereinabove and the remainder by using part of the main process steam stream in condensing turbine 23 and exporting the remaining steam amounting to about 10,000 to 15,000 pounds per hour. The process steam is initially produced by heat exchange with the converted gas stream 35 in the plant main feed water heater 36, is then led via line 54 to furnace 16 in which it is further heated at 18 and finally is fed through line 20 to condensing turbine 23. Export steam is removed from line 20 through line 55. Uncondensed steam from turbine 23 is eliminated and condensed in condenser 56.

EXAMPLE 2

The improvement in accordance with the invention is applied to a 250 ton/day sulphuric acid plant using sulphur, air and water as raw materials. The plant is similar to that illustrated in the FIG. 1 but has no sulphur trioxide condensing unit. In this Example, air is compressed, cooled, and dried under an intermediate pressure of about 7 atmospheres. The agent used in the drying is the sulphuric acid stream leaving the bottom of the absorber and it contains most of the unconverted sulphur dioxide leaving the converter system. In this drying operation, the sulphur dioxide content of the acid is reduced from about 90 ppm to about 9 ppm resulting in liberating sulphur dioxide being transferred to the air entering the process at the rate of about 40 lbs./hr. The moisture content of the air is also reduced to below 1 mg/SCF which is very acceptable in conventional acid plants. 98% sulphuric acid is used at temperatures of about 60° C.

The dry air containing the recycled unconverted sulphur dioxide is then further compressed to a pressure level of 22 atmospheres and at this pressure is used to burn sulphur in the high pressure sulphur furnace resulting in the production of a hot gas containing 9% sulphur dioxide at a temperature near 1000° C. This gas stream is then cooled to a temperature of about 400° C. and passed through a series of catalyst beds in which the bulk of the sulphur dioxide is oxidised to sulphur trioxide (99.7% oxidation). The gas stream leaving the converter which contains about 300 ppm of sulphur dioxide is then cooled and introduced into the absorber where all of the sulphur trioxide and about 90% of the remaining unconverted sulphur dioxide are absorbed. Gas leaving the sulphur trioxide absorber is then reheated, expanded to atmospheric pressure through a power recovery turbine, and exhausted to atmosphere containing about 40 ppm of sulphur dioxide. Acid in the absorber is at about 40° C. and has a concentration of 98-99%.

In the above operations, the acid flow amounts to about 400,000 lbs./hr. and flow is from the top of the absorber through the absorber and thence to the top of the air drying tower/stripper using the differential in pressure between the two systems to ensure flow. From the air drying tower the acid flows to the pump tank and is then pumped by the system circulating pumps to the acid cooler and back to the top of the absorber. This flow compares favourably with the circulating flow required in each system for drying or absorbing and results in one acid system with one set of pumps in place of the two systems with complete separate controls normally used.

Using the above exemplified process of the invention it is possible to obtain an exit gas having a sulphur dioxide content as low as 20 ppm., which corresponds to an overall plant efficiency of 99.98%.

EXAMPLE 3

In a most preferred embodiment diagrammatically illustrated in FIG. 2, the process is applied to a 2000 ton/day sulphuric acid plant using sulphur, air and water as raw materials and designed for an overall efficiency of 99.85%.

In the process, an inlet air stream 56 amounting to 98000 cubicfeet/minute, a sufficient amount to produce a feed gas stream containing 12% by weight of sulphur dioxide, is drawn through an air filter 57 and then introduced into a drying tower 58 at atmospheric pressure in which it is contacted with a large countercurrent stream of concentrated sulphuric acid having, as will be explained hereinafter, a high content of sulphur dioxide. In said drying tower 58, the air is dried by contact with the sulphuric acid and the dissolved sulphur dioxide is stripped from the acid whereby a stream 59 of dry air containing the desorbed sulphur dioxide and a stream 60 of essentially sulphur dioxide-free sulphuric acid are generated. After sulphuric acid mist removal by conventional mist removal (not shown), the dry air stream 59 is compressed to about 20 atmospheres in suitable compression equipment represented by primary compressor 61 and secondary compressor 62 with intermediate cooling if necessary in coolers 63. The dry air now at a pressure of about 20 atmospheres is then fed to sulphur burning furnace 64 through line 65 in admixture with an amount of tail gas introduced through line 66 and said compressor 62 and used to control the temperature in said furnace 64. A stream of sulphur 67 is fed to furnace 64 in which it is burned in contact with the air fed through line 65 and a feed gas stream 68 is thus formed which contains about 10% by weight of sulphur dioxide. The temperature of the gas produced in the furnace is reduced to the desired level for catalysis by heat exchange with tail gas fed through line 69 prior to expansion thereof in expander 70, by formation of steam at 71 and by superheating of steam circulated from steam drum 72 through line 73, the superheated steam being thereafter fed by line 74 to a turbine 75.

The cooled feed gas stream 68 which contains about 10% by weight of sulphur dioxide is then introduced into converter 76 in which the sulphur dioxide is oxidized essentially completely to sulphur trioxide, the heat evolved in the oxidation being transferred by heat exchange, to tail gas circulated through the converter through line 69.

From the converter 76 in which a conversion of 99% is attained, a converted gas stream 77 evolves which is now cooled by passage through coolers 78 and 79 and is thereafter passed through a condenser 80 in which approximately 70% by weight of the sulphur trioxide and 50% by weight of the sulphur dioxide are liquified, the uncondensed part of the converted gas stream being fed through line 81 to an absorber 82 for sulphur trioxide and sulphur dioxide removal therefrom. In absorber 82, a stream 83 of essentially sulphur dioxide-free sulphuric acid of about 98% strength and at 35° C. is brought into countercurrent contact with the converted gas stream fed through line 81 whereby about 65% by weight of the sulphur dioxide and essentially all of the remaining sulphur trioxide are absorbed by the sulphuric acid. This absorption step results in a tail gas stream 84 having such a low content of sulphur dioxide that it corresponds to an overall plant efficiency of 99.8% as contrasted with a conversion efficiency of only 99% in the converter.

The tail gas stream 84 is then divided into a minor stream 66 which is recycled in the process as hereinbefore explained, and into a main stream 69 which is reheated in converter 76 to about 500° C. and in furnace 64 to about 550° C. prior to expansion in expander 70 where energy equivalent to 22,000 HP is recovered to assist in the driving of compressors 61 and 62 which theoretically require 33,000 HP. After energy recovery the tail gas which contains a negligible amount of sulphur trioxide, a very small quantity of sulphuric acid mist and about 200 ppm of sulphur dioxide is exhausted to atmosphere through line 85 and a stack (not shown) at a temperature of 150° C. to 200° C.

After having absorbed the sulphur trioxide and sulphur dioxide from the converted gas stream in absorber 82, the concentrated sulphuric acid stream 83 which at entrance into said absorber had a strength of 98% and a sulphur dioxide content of about 40 to 50 ppm, leaves the absorber through line 86 with an increased strength of 98.5% and an increased sulphur dioxide content of about 200 ppm at an increased temperature of 50° C. due to heat generated by sulphur trioxide absorption. The sulphur dioxide-rich sulphuric acid stream 86 is then mixed at the absorber pressure of 20 atmospheres with the sulphur dioxide/sulphur trioxide co-condensate stream 87 from condensor 80 and the resulting combined stream 88 which now has a strength of 99 to 99.5% and is at a temperature of 65° C., is passed to a let-down device or turbine 89 wherein the pressure is lowered to essentially atmospheric with generation of energy equivalent to about 300 HP. Upon leaving turbine 89 the sulphur dioxide-rich acid stream at atmospheric pressure is fed through line 90 to cooler 91 where it is cooled to about 30° C. and then passed to drying tower 58 through line 92. Any necessary water to adjust the strength of the acid is added to the bottom of the drying tower through line 93 and the acid stream 60 is withdrawn at 65° C. through a cooler to a pump tank 95 from which a minor portion of the acid is bled off as product through line 96 and the major portion is taken through line 97 into a 500 HP acid pump 98 which raises the pressure to a sufficient level for flow through line 83 to absorber 82.

Superheated steam amounting to about 200,000 pounds/hour is produced in the process from a cold demineralized boiler feed water with heat recovered by heat exchange in coolers 63 (between compressors 61 and 62), in furnace 64 at 71 and 73 and from converted gas stream 69. Additional heat is available in tail gas stream 85 and in the compressor train if required. The superheated steam stream 74 expanded through turbine 75 generates the additional 11,000 HP necessary to drive compressors 61 and 62. The steam export stream 99 at about 7 atmospheres and 285° C. is then exported and amounts of about 1.15 tons/ton of sulphuric acid.

While in the preferred embodiments of the invention, liquid sulphur trioxide is obtained by direct condensation, it should be understood that this is not the only way by which it can be obtained. One other way, for instance, is to feed the converted gas at least in part to an oleum unit where sulphur trioxide is dissolved in concentrated sulphuric acid, any undissolved gas being fed to the absorbing unit. Up to 100% of the resulting oleum can be injected in the circulating acid stream with the remainder, if any, being recovered as product which can thereafter be distilled to produce sulphur trioxide.

Although elemental sulphur has been chosen in the above examples as the source of sulphur dioxide, it should be understood that other sources are also suitable such as liquid sulphur dioxide, hydrogen sulphide, off gases from sulphide ore roaster, etc.

The concentration of the sulphuric acid stream circulated in the absorber and the drying tower can vary within the lower limit of 93% which is determined by the capacity of the acid to remove water vapour in the drying tower, and the higher limit of 100% at which it is possible to obtain oleum. In practice, the most concentrated acid in the process is found at the point where the sulphur trioxide condensate and sulphuric acid stream from the absorber are mixed (when a sulphur trioxide condenser is used) or at the sulphuric acid exit from the absorber (when no sulphur trioxide condenser is used). For best results such as optimum drying, minimum corrosion of the equipment and optimum absorption of sulphur trioxide it has been found that the strength of the sulphuric acid stream should be kept within the range of 98% to 99%.

While certain representative embodiments and details have been described for the purpose of illustrating the invention it will be apparent to those skilled in the art that various changes and modifications can be made therein without departing from the spirit and scope of the invention.

What we claim is:

1. In a process for making sulphuric acid in which a stream of air is passed through a drying unit where it is dried with a stream of concentrated sulphuric acid, the resulting dry process air is compressed to a pressure of 5 to 50 atmospheres and fed to a converter along with a dry sulphur dioxide-containing process gas stream wherein the sulphur dioxide is catalytically converted to sulphur trioxide and the resulting converted gas stream containing the sulphur trioxide together with a minor amount of unconverted sulphur dioxide is fed to an absorber wherein it is contacted with a stream of a sulphuric acid solution to form further sulphuric acid, the improvement comprising supplying to the absorber a stream of sulphuric acid solution essentially free of sulphur dioxide and passing said acid solution through the absorber countercurrently to the stream of converted gas under conditions whereby the unconverted sulphur dioxide present in the latter is dissolved in the sulphuric acid, reheating at least a portion of the exit gas from the absorber, and passing said portion of the reheated exit gas through an expander and thereafter discharging to the atmosphere, taking the entire flow of sulphur dioxide-containing sulphuric acid from the absorber and cooling and decompressing it to a pressure within the range of atmospheric pressure to 10 atmospheres but lower than that existing in the absorber by at least 4 atmospheres, passing said entire flow of sulphur dioxide-containing sulphuric acid at the resulting reduced pressure through the drying unit countercurrently to the stream of air which is free of $SO_2$ whereby simultaneously moisture is transferred from the air to the acid and sulphur dioxide is transferred from the acid to said air, using the resulting mixture of sulphur dioxide and dry air as process air, taking the essentially sulphur dioxide-free sulphuric acid stream from the drying unit and dividing it into two portions of which one is withdrawn as product sulphuric acid and the other is pumped directly to the absorber and used as the sulphuric acid solution for further absorption of sulphur dioxide and sulphur dioxide from the converted gas stream, said improvement being further characterized in that the sulphur dioxide absorbed by the sulphuric acid is transferred from the acid to the air such that the portion of sulphur dioxide-free sulphuric acid stream which is pumped directly to the absorber is capable of absorbing essentially all of the unconverted sulphur dioxide in the absorber.

2. A process as claimed in claim 1, wherein said sulphur dioxide-containing process gas stream is obtained by combustion of sulphur.

3. A process as claimed in claim 2, wherein there is a single absorber.

4. A process as claimed in claim 2 wherein a portion of the gas stream leaving the absorber is recirculated to the sulphur combustion step.

5. A process as claimed in claim 1, wherein said sulphur dioxide-free sulphuric acid stream from the drying unit is cooled before pumping to the absorber.

6. A process as claimed in claim 1, wherein before it is fed to the absorbing unit, the converter gas stream is passed through a condenser whereby 5% to 90% by weight of the sulphur trioxide and up to 70% by weight of the sulphur dioxide present therein are co-condensed.

7. A process as claimed in claim 6, wherein up to 100% of the resulting liquid co-condensate is injected into the sulphuric acid stream as it emerges from the absorbing unit and the remainder, if any, is recovered as product liquid sulphur trioxide.

8. A process as claimed in claim 7, wherein the pressure in the absorbing unit is within the range of 15 to 25 atmospheres and that in the drying unit is from atmospheric pressure to 5 atmospheres.

9. A process as claimed in claim 8, wherein the pressure in the drying unit is atmospheric pressure.

10. A process as claimed in claim 1, wherein the pressure in the absorbing unit is within the range of 15 to 25 atmospheres and that in the drying unit is from atmospheric pressure to 5 atmospheres.

11. A process as claimed in claim 10, wherein the prssure in the drying unit is atmospheric pressure.

12. A process as claimed in claim 10, wherein the pressure in the drying unit is lower than that existing in absorbing unit by at least 15 atmospheres.

13. A process as claimed in claim 10, wherein the temperature of the acid stream at the entrance into said absorber is from about 20° C. to 60° C. and at the entrance to the drying unit is about 20° C. to 75° C.

14. A process as claimed in claim 13, wherein the temperature of the acid stream at the entrance into said absorber is about 30° to 50° C. and at the entrance to the drying unit is about 30° to 50° C.

15. In a process for making sulphuric acid in which a stream of air is passed through a drying unit where it is dried with a stream of concentrated sulphuric acid, the resulting dry process air is compressed to a pressure of 5 to 50 atmospheres and fed to a converter along with a dry sulphur dioxide-containing process gas stream wherein the sulphur dioxide is catalytically converted to sulphur trioxide and the resulting converted gas stream containing the sulphur trioxide together with a minor amount of unconverted sulphur dioxide is fed to an absorber wherein it is contacted with a stream of a sulphuric acid solution to form further sulphuric acid, the improvement comprising supplying to the absorber a stream of sulphuric acid solution essentially free of sulphur dioxide and passing said acid solution through the absorber countercurrently to the stream of converted gas under conditions whereby the unconverted sulphur dioxide present in the latter is dissolved in the sulphuric acid, reheating a least a portion of the exit gas from the absorber, and passing said portion of the reheated exit gas through an expander and thereafter discharging to the atmosphere, taking the entire flow of sulphur dioxide-containing sulphuric acid from the absorber and decompressing it to a pressure within the range of atmospheric pressure to 10 atmospheres but lower than that existing in the absorber by at least 4 atmospheres, passing said entire flow of sulphur dioxide-containing sulphuric acid at the resulting reduced pressure through the drying unit countercurrently to the stream of air which is free of $SO_2$ whereby simultaneously moisture is transferred from the air to the acid and sulphur dioxide is transferred from the acid to said air, using the resulting mixture of sulphur dioxide and dry air as process air, taking the essentially sulphur dioxide-free sulphuric acid stream from the drying unit and cooling and dividing it into two portions of which one is withdrawn as product sulphuric acid and the other is pumped directly to the absorber and used as the sulphuric acid solution for further absorption of sulphur trioxide and sulphur dioxide from the converted gas stream, said improvement being further characterized in that the sulphur dioxide absorbed by the sulphuric acid is transferred from the acid to the air such that the portion of sulphur dioxide-free sulphuric acid stream which is pumped directly to the absorber is capable of absorbing essentially all of the unconverted sulphur dioxide in the absorber.

16. A process as claimed in claim 15, wherein said sulphur dioxide-containing process gas stream is obtained by combustion of sulphur.

17. A process as claimed in claim 16, wherein there is a single absorber.

18. A process as claimed in claim 15, wherein before it is fed to the absorbing unit, the converter gas stream is passed through a condenser whereby 5% to 90% by weight of the sulphur trioxide and up to 70% by weight of the sulphur dioxide present therein are co-condensed.

19. A process as claimed in claim 18, wherein up to 100% of the resulting liquid co-condensate is injected into the sulphuric acid stream as it emerges from the absorbing unit and the remainder, if any, is recovered as product liquid sulphur trioxide.

20. A process as claimed in claim 19, wherein the pressure in the absorbing unit is within the range of 15 to 25 atmospheres and that in the drying unit is from atmospheric pressure to 5 atmospheres.

21. A process as claimed in claim 20, wherein the pressure in the drying unit is atmospheric pressure.

22. A process as claimed in claim 15, wherein the pressure in the absorbing unit is within the range of 15 to 25 atmospheres and that in the drying unit is from atmospheric pressure at 5 atmospheres.

23. A process as claimed in claim 22, wherein the pressure in the drying unit is atmospheric pressure.

24. A process as claimed in claim 22, wherein the pressure in the drying unit is lower than that existing in absorbing unit by at least 15 atmospheres.

25. A process as claimed in claim 22, wherein the temperature of the acid stream at the entrance into said absorber is from about 20° C. to 60° C. and at the entrance to the drying unit is about 20° to 75° C.

26. A process as claimed in claim 25, wherein the temperature of the acid stream at the entrance into said absorber is about 30° to 50° C. and at the entrance to the drying unit is about 30° to 50° C.

27. A process for making sulphuric acid wherein a stream of air is passed through a drying unit where it is dried by a stream of concentrated sulphuric acid, the dry air is compressed to a pressure of 5 to 50 atmospheres and fed to a converter as part of a dry sulphur dioxide-containing process gas stream where in the sulphur dioxide is catalytically converted to sulphur trioxide, the resulting sulphur trioxide gas is passed through an absorbing tower whereby the sulphur trioxide present is removed by a second stream of concentrated sulphuric acid, at least a portion of the exit gas from the absorber is then reheated, passed through an expander and a portion discharged to atmosphere, said process being further characterized by passing an essentially sulphur dioxide free acid stream to the absorber countercurrent to the stream of converted gas under conditions such that all the sulphur trioxide and essentially all the unreacted sulphur dioxide leaving the converter are absorbed, taking the entire flow of said acid stream from the absorber through cooling to a lower pressure lying between atmospheric pressure and a pressure 4 atm below that in the absorber and passing said acid stream through a drying tower at said lower pressure countercurrent to the essentially sulphur dioxide free process air stream whereby the air is dried and essentially all the sulphur dioxide is transferred from the acid stream to the air stream, thus being recycled in the process, using the dry sulphur dioxide containing air stream as process air, removing the essentially sulphur dioxide free acid stream and splitting it into a product stream and an absorber feed stream which is then pumped to the top of the absorber.

28. The process described in claim 27, in which a portion of the gas stream leaving the absorber is supplied through a compressor to the dry air stream.

29. The process of claim 27 in which the acid feed stream to the absorber is cooled.

* * * * *